US010771497B1

(12) United States Patent
Xie et al.

(10) Patent No.: US 10,771,497 B1
(45) Date of Patent: *Sep. 8, 2020

(54) USING IP ADDRESS DATA TO DETECT MALICIOUS ACTIVITIES

(71) Applicant: DataVisor, Inc., Mountain View, CA (US)

(72) Inventors: Yinglian Xie, Cupertino, CA (US); Fang Yu, Sunnyvale, CA (US)

(73) Assignee: DataVisor, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,208

(22) Filed: Nov. 12, 2018

Related U.S. Application Data

(63) Continuation of application No. 14/620,062, filed on Feb. 11, 2015, now Pat. No. 10,129,288.

(60) Provisional application No. 61/938,606, filed on Feb. 11, 2014.

(51) Int. Cl.
*H04L 29/06* (2006.01)

(52) U.S. Cl.
CPC ...... *H04L 63/1441* (2013.01); *H04L 63/1408* (2013.01); *H04L 63/1416* (2013.01); *H04L 63/1425* (2013.01); *H04L 2463/144* (2013.01)

(58) Field of Classification Search
CPC . H04L 63/14; H04L 63/1408; H04L 63/1416; H04L 63/1425; H04L 63/1441
See application file for complete search history.

(56) References Cited

U.S. PATENT DOCUMENTS

| 6,742,128 | B1* | 5/2004 | Joiner | H04L 63/1408 726/25 |
| 8,312,540 | B1* | 11/2012 | Kahn | G06F 21/552 713/183 |
| 8,677,488 | B2* | 3/2014 | Kang | H04L 41/142 726/23 |
| 8,789,171 | B2* | 7/2014 | Osipkov | H04L 67/22 726/22 |
| 8,849,921 | B2* | 9/2014 | Morss | H04L 51/12 709/206 |
| 9,467,464 | B2* | 10/2016 | Gula | H04L 63/1433 |
| 10,129,288 | B1 | 11/2018 | Xie et al. | |
| 2009/0013410 | A1* | 1/2009 | Kaler | G06F 21/554 726/25 |

(Continued)

OTHER PUBLICATIONS

Student's t-distribution. Wikipedia, the Free Encyclopedia. Last modified Feb. 10, 2015. Retrieved on Feb. 11, 2015. Retrieved from the Internet: URL<http://en.wikipedia.org/wiki/Student%27s_t-distribution>. 19 pages.

*Primary Examiner* — Linglan E Edwards
(74) *Attorney, Agent, or Firm* — Fish & Richardson P.C.

(57) ABSTRACT

Methods, systems, and apparatus, including computer programs encoded on computer storage media, for detecting malicious activities. One of the methods includes obtaining a collection of user event logs or receiving user events through real-time feeds; using data from the user event logs/feeds to determine IP address properties for individual IP addresses and IP address ranges; and for each incoming event, updating the IP address properties for the corresponding IP address and IP prefix properties.

14 Claims, 3 Drawing Sheets

(56) References Cited

U.S. PATENT DOCUMENTS

| | | | |
|---|---|---|---|
| 2009/0249480 A1* | 10/2009 | Osipkov | H04L 67/22 |
| | | | 726/22 |
| 2010/0313264 A1 | 12/2010 | Xie et al. | |
| 2011/0082768 A1* | 4/2011 | Eisen | H04L 63/1483 |
| | | | 705/26.35 |
| 2013/0185230 A1* | 7/2013 | Zhu | G06Q 10/107 |
| | | | 706/12 |
| 2015/0121461 A1* | 4/2015 | Dulkin | H04L 63/1408 |
| | | | 726/4 |
| 2015/0161394 A1* | 6/2015 | Ferragut | G06F 21/577 |
| | | | 726/25 |
| 2015/0293637 A1* | 10/2015 | Wadman | G06F 3/04883 |
| | | | 345/173 |
| 2016/0364750 A1* | 12/2016 | Malloy | H04L 63/1441 |

* cited by examiner

USING IP ADDRESS DATA TO DETECT MALICIOUS ACTIVITIES

CROSS-REFERENCE TO RELATED APPLICATIONS

This application is a continuation of U.S. application Ser. No. 14/620,062, filed on Feb. 11, 2015, now U.S. Pat. No. 10,129,288, which claims the benefit under 35 U.S.C. § 119(e) of the filing date of U.S. Patent Application 61/938,606, which was filed on Feb. 11, 2014. The disclosures of the prior applications are considered part of and are incorporated by reference in the disclosure of this application.

BACKGROUND

This specification relates to detecting malicious activities.

The flourish of online services has attracted numerous attackers to conduct a wide range of nefarious activities, ranging from spam posts, phishing emails, fake invitations, cheated games, artificially promoted ads, to fraudulent financial transactions. Recent observations have identified an increased number of attacks of different forms, affecting online services of all sizes, for example, ranging from millions of compromised accounts to hundreds of millions fake accounts being crated on various social networking sites and numerous small online forums.

Although each attack may look different in scale and method, a common thread typically found among them is the requirement of a large number of malicious user accounts. These accounts can either be newly created or can be obtained by compromising real user accounts. Guarding the legitimate accounts and detecting malicious accounts is thus ultimately critical to ensure the success of all online services.

Modern professional attackers do not work individually. Instead, they play different roles and do business with each other. The entity that creates malicious accounts is usually different from the one that actually leverages the fake accounts for misdeeds. By collaborating with each other, these attackers can best use resources of others and obtain money more efficiently.

SUMMARY

The system described in the present specification includes a common backend engine for analyzing user/web event logs.

The engine takes a holistic view of data and performs host property analysis and graph analysis. For example, taking customer data as input, the host property analysis automatically generates information about botnet hosts, attack proxies, and dedicated attack hosts, all from input event logs. Therefore, our outputs are more applicable to our customers than commonly available IP address reputation data (e.g., Spamhaus feed).

The system also constructs and analyzes several types of activity graphs. A global view of the connectivity structures among users and events allows the system to perform early detection of stealthy attack patterns that are difficult to identify when each user or event is examined in isolation.

Based on host property analysis and graph analysis, the system selects activity features and generates attack models that can be fed into real-time detection using a machine-learning framework. Based on the specific attack methods and scales, the system generates different attack models automatically. For example, for content spam attacks, the system generates content-based signatures as well as user behavior patterns to capture attack campaigns. For fraudulent transaction attacks, the system generates a list of suspicious accounts for blocking their future transactions, with a detection confidence score for each account.

The system performs comprehensive IP address analysis to derive information about botnet hosts, attack proxies, and dedicated attack hosts, all from input event logs. The precise knowledge about the types of malicious hosts is important for accurate detection and remedy strategies. For example, the system can easily block all malicious activities from dedicated malicious hosts. However, the same traffic blocking approach cannot be applied to legitimate proxy hosts.

In some implementations, the host information is derived based on customers' input data, instead of being straightforwardly extracted from commonly available external IP address category and reputation data, e.g., Quova, Maxmind, or Spamhaus feed. For example, the proxy lists generated from external lists may be irrelevant to the customer dataset, while the real proxy hosts in the customer data may not be classified by the external lists as such. To give a concrete example, consider a data center IP address from A.com that is associated with a lot of user traffic to service B.com. Such scenario could happen when A.com offers its users the option to directly log in to B.com from A.com's platform. From B.com's perspective, A.com's IP addresses are essentially legitimate proxy IP addresses, while the classification from external lists may indicate otherwise.

An IP address analysis module examines a comprehensive set of signals, including routing information, user population distribution, diurnal patterns, as well as neighboring user behaviors on the same set or related set of IP addresses. From these signals, the system classifies the observed hosts accordingly. Since the signals are extracted from the input data, the derived host properties are more applicable to the customer's user populations and thus more relevant.

In general, one innovative aspect of the subject matter described in this specification can be embodied in methods that include the actions of obtaining a collection of user event logs or receiving user events through real-time feeds; using data from the user event logs/feeds to determine IP address properties for individual IP addresses and IP address ranges; and for each incoming event, updating the IP address properties for the corresponding IP address and IP prefix properties. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes, using the IP address properties to perform attack detection. The determined IP address properties for one or more users includes the respective user's predictable IP address or IP address range. The predictable IP address of a user is used to determine a likelihood of a compromised or fake user account. Determining the user's predictable IP address or IP address range includes: determining a frequency at which the user uses a particular IP address or IP range; and calculating the probability of the user using the particular IP address or IP range based on a calculated confidence interval of future appearance using the determined frequency. The determined IP address properties for one or more users includes determining, for one or more users, user co login to derive correlations/similarities of users and user activities on an IP address. Determining user co-login includes: calculating a likelihood of user co-login based on the likelihood of each user using a particular IP address and the number of user co-loin to the IP address during a specified time frame.

In general, one innovative aspect of the subject matter described in this specification can be embodied in methods that include the actions of obtaining IP stats data including one or more of a collection of user event logs or receiving user events through real-time feeds for a plurality of users; building IP address properties for both individual IP addresses IP address ranges, wherein building IP address properties includes using the obtained data to derive new IP properties including one or more of predictable IP address or IP address ranges, user co-login data, or malicious proxy detection; and using one or more of the derived new IP properties to perform attack detection.

The foregoing and other embodiments can each optionally include one or more of the following features, alone or in combination. The method further includes, using unevenness distribution of activities among different service providers to detect attacks that are targeted for one or more specific services.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

The present specification describes techniques for using user activity logs to derive customized IP-address properties. In particular, the specification describes techniques for applying a user's predictable IP address or predictable IP address range information to detect malicious accounts, compromised accounts, and malicious activities.

Conventional defense systems focus on the last stage of the attacks for detection, i.e., when the malicious accounts are actually used to abuse service and perform attacks, for example, posting ads, spamming, abusing computation resources on cloud-computing environments, or performing fraudulent transactions. As attack formats and methods frequently evolve, it is often difficult to detect new attacks.

Therefore, most of the conventional detection systems are reactive. They typically are effective only after the attack has happened; in particular after the new attack patterns have been observed and learned by manual efforts. For example, by examining new fraudulent transactions or spam campaigns, human experts can derive new rules or generate new content signatures. These solutions have drawbacks, for example: 1) They are often effective after attackers have conducted malicious activities. So damage may have already occurred. Even if the systems effectively detected these accounts and blocked them, it may not impact the attack eco-system because attackers can always sign up free new accounts again with a low cost. 2) The detection results are often incomplete. Such solutions can detect only actively attacking accounts, while missing a large number of malicious accounts that are still in various incubation stages.

In addition, most attack detection systems work in isolation. 1) They usually examine each event individually, losing the power of a global view to detect large-scale, coordinated attacks. 2) They often rely on experts to manually create rules or other attack signatures. As attacks get increasing stealthy, it is difficult for human experts to manually discover new sophisticated attack patterns that involve many different types of events and steps. 3) They often rely on many application specific signals, such as post contents or financial transaction details. These signals are specially crafted for each service and site. They are hard to transfer to other systems.

In contrast with the conventional attack detection systems, the systems and techniques described in the present specification specifically focus on account security. The aim is to secure every "good" user's account and detect all attacker-created malicious accounts.

Architecture

A big data analytics engine can be constructed to provide account security as a service. In some implementations, the big data analytics engine operates on a cloud. In some other implementations it operates on a server system, e.g., for a particular company. The input to the system includes Web logs that are readily available from many services (e.g., account sign-in and sign-up logs). Consequently, the architecture does not require individual customers to purchase additional hardware. Through data analysis, the big data analytics engine can automatically detect fake accounts, compromised accounts, and various malicious account activities, e.g., spam, phishing, fraudulent transactions or payments. The system sends back detection results both in real-time and through periodic updates.

Through detecting malicious/compromised accounts, the system can pro-actively help fighting different forms of malicious activities, e.g., spam, phishing, cloud-computing abuse, fraudulent transactions or payments.

Inputs

In the analysis engine of the system, the process to compute IP address properties is call the IP-stat process. The IP-stat analysis takes user event logs as inputs. Example logs include user login log, signup log, or transaction logs.

Fields for each event include:
1. Event type: e.g., sign-up, login, post-comment, payment
2. Event success: 0 or success 1 for failure
3. User name or user identifier (ID) (can be annoymized)
4. Login timestamp
5. Login IP address In some implementations, the above 5 fields are necessary to the IP-stat process. The user IDs can be anonymized. However, the anonymization process is configured to preserve a 1-1 mapping between the real user ID and an anonymized user ID, so that the system can keep track of a user's activity. The real user IDs often provide information for detection as well, since malicious accounts often have strong naming patterns.

Other information or meta-data regarding a user event is not required, but can help increase the detection coverage and accuracy. The system can optionally obtain the following fields from the user event:
1. User-agent of the event
2. For a transaction event, the transaction amount, and the associated payment or purchase information (e.g., Paypal account ID or purchased products). Note that credit card or bank account information is not needed.

Table 1 below illustrates example inputs to the analysis engine:

TABLE 1

| Event ID | Event type | Event success | UserID | Timestamp | IP address |
|---|---|---|---|---|---|
| 1 | Login | 0 | HE12BN | 11/20/2013 12:35:06 | 128.2.34.5 |
| 2 | Signup | 1 | AXV34K | 11/20/2013 13:05:35 | 100.25.7.39 |
| 3 | Post | 1 | G8VB0M | 11/21/2013 09:11:47 | 23.9.44.37 |

Operation Flow

Figure 1:
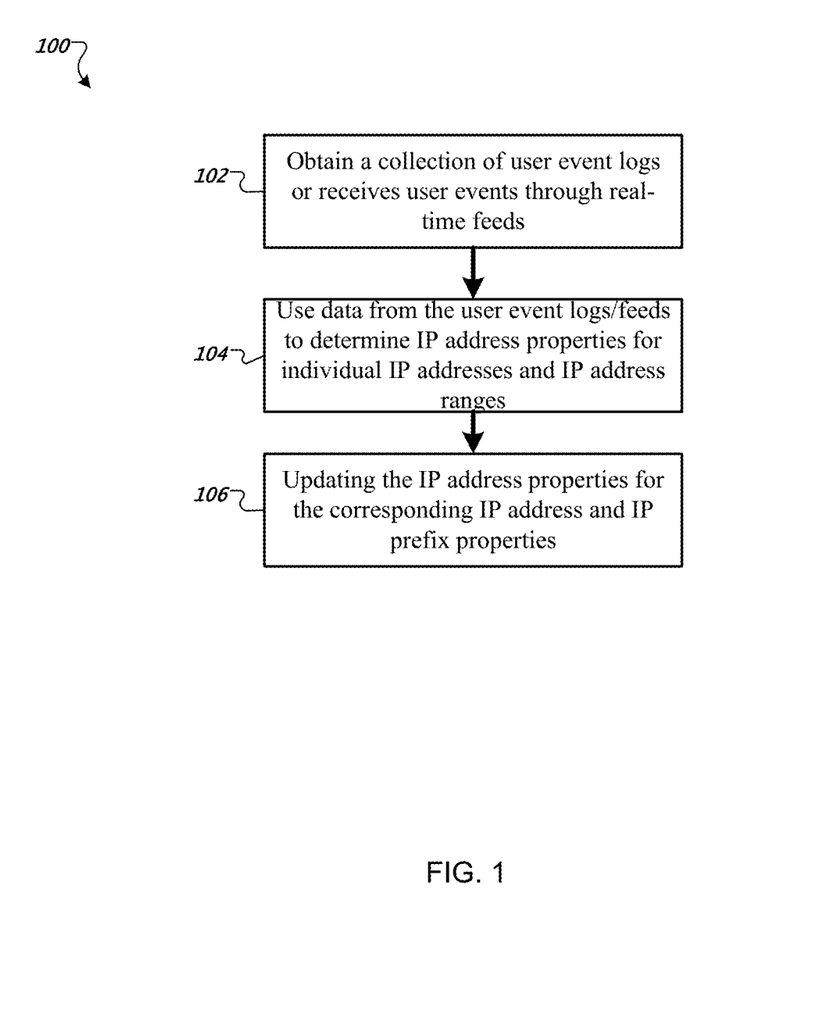
FIG. 1 illustrates an example one-time IP-stat process.

The IP-stat process builds the IP address properties for both individual IP addresses and IP address ranges (prefixes). An example one time IP-stat process 100 is shown in FIG. 1. For convenience the process 100 is described with respect to a system that performs the process. The system obtains a collection of user event logs or receives user events through real-time feeds (102). The system uses data from the user event logs/feeds to determine IP address properties for individual IP addresses and IP address ranges (104). The system, for each incoming event, updates the IP address properties for the corresponding IP address and IP prefix properties (106). The IP prefix information could be derived by BGP table updates (publically available), or by using third party information.

The IP stat process has two modes of operation. The first is the realtime mode, as shown in the example flow 200 of FIG. 2, where the IP-stat process is up all the time. In this mode, the system architecture includes a front-end dispatch server 202 and IP-stat processing engines 204a, 204b, and 204c that work together. The front-end dispatch server 202 determines a correct back-end IP stat server for real-time updates and sends the information over to the selected server. The IP stat servers then update the statistics.

Figure 2:
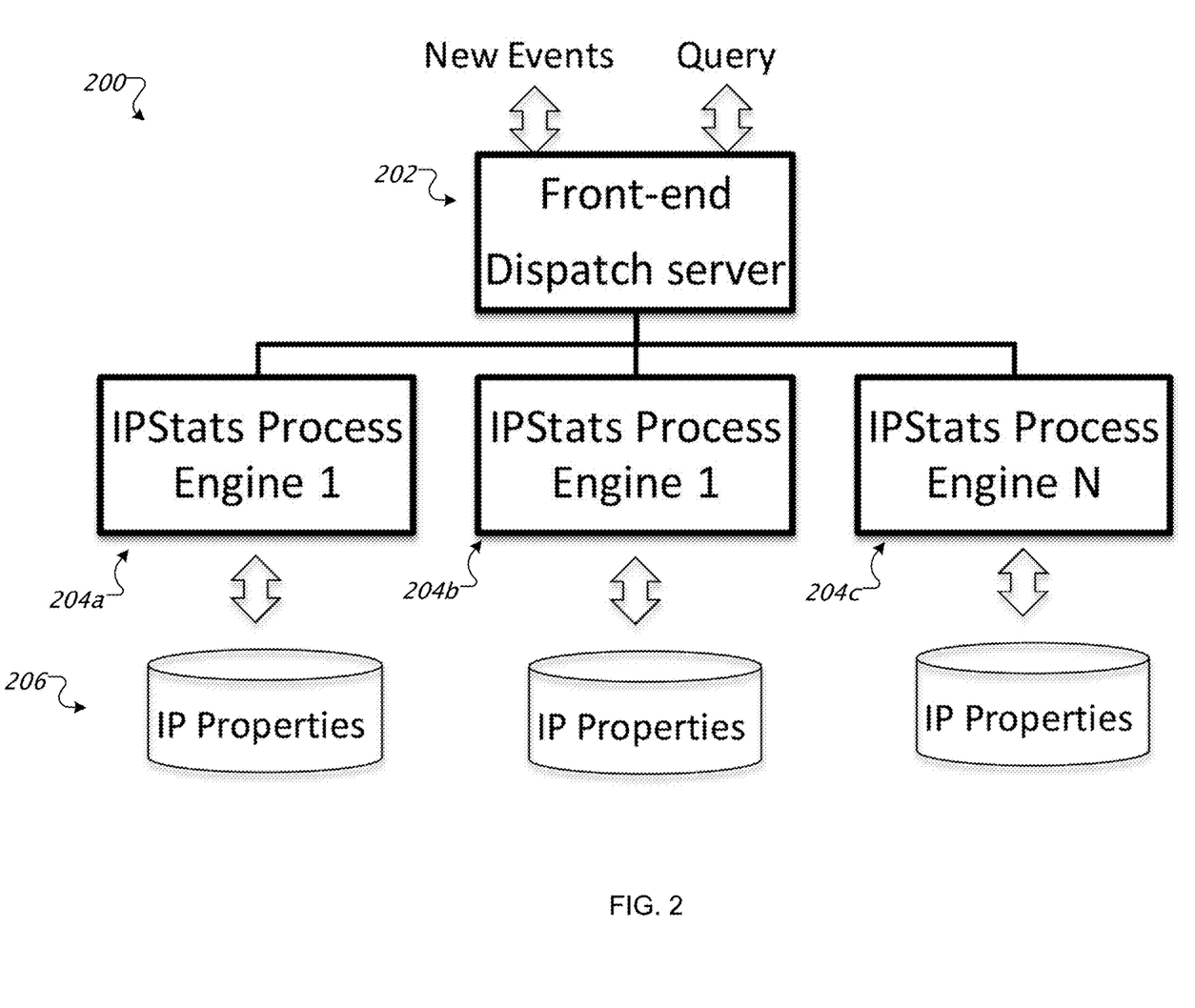
FIG. 2 illustrates an IP-stat process in realtime mode.

In a small setup, a single IP-stat processing engine can handle all traffic. More commonly, there are multiple IP-stat process engines running in parallel, each computing IP-stats for a subset of IP addresses/prefixes.

The front-end dispatch server 202 takes in events (realtime user events or realtime queries) and dispatches the events into one or more of the IP-stat processing engines 204. There can be multiple engines that are relevant to one event/query. For example, the system can update the information related with both an IP address and an IP address prefix 206.

Each IP-stat processing engine 204 periodically backups its state to persistent storage (e.g., one or more hard disks). When encountering a failure, the IP-stat processing engine can read its state from the persistent storage and resume.

Figure 3:
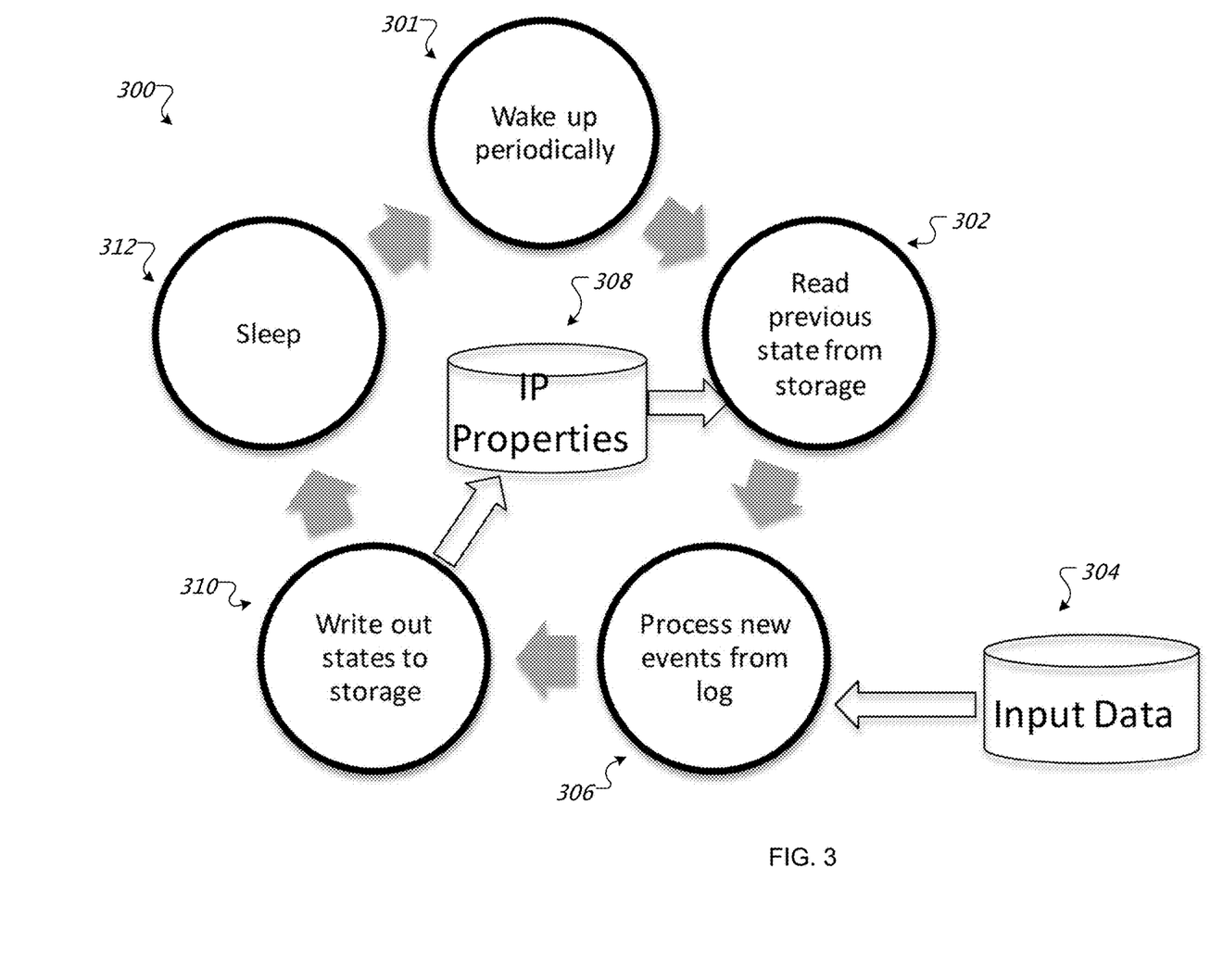
FIG. 3 illustrates the IP-stat process in batch mode.
Like reference numbers and designations in the various drawings indicate like elements.

In addition to the realtime mode, the IP-stat engine can also operate in a batch mode as shown in the example diagram 300 of FIG. 3. In the batch mode, the system architecture still includes a front end dispatch server and multiple IP-stat processing engines, although the figure only shows the operation of one example IP processing engine for simplicity. Each IP-stat process engine is only active periodically (301). When the IP-state processing engine is active, the particular IP-stat process engine reads the previously computed IP address properties from persistent storage (302). To analyze new data (304), it also reads the event logs (306). After performing the analysis, the IP-stat processing engine updates the IP address properties (308), writes out them to persistent storage (310) including user states, which include multiple user states and features, and then returns to a sleep state (312).

The IP stats output results are fed to the detection modules for further analysis and attack detection. For example, the IP features can be combined with user-level features to perform attack detection.

There can be different types of detection modules. The simplest type of detection module rule-based detection module. In the rule-based detection module, each rule specifies a pre-defined pattern of user behavior. It is typically in the form of boolean combinations of simple user behaviors. An example rule could be to detect any users that are (1) newly registered within a specified time period e.g., 1 day, and (2) purchased aggressively with purchasing velocity, for example, higher than 2 transactions per 5 minutes. Another example rule could be to detect any users that make purchase or post comments from a pre-defined blacklist.

More advanced modules can be machine-learning based or graph-based. The output detection results can be fed to the online service directly or fed to the frontend realtime detection engines. In addition, the output results will also be fed back to the IP stat process to update the computed states. As an example, the IP-stat process module records how many detected bad users/events for each related IP address and IP address range.

In some implementations, in operation, customers push each events to the IP-stat process. The output from the IP-state process provides a score indicating the confidence of this event being associated with malicious activities. In some other implementations, customers push events periodically or in real time. The analysis results are in the form of a set of signals, to be deployed by the customers for real-time detection. The signals are customized according to the types of attacks and they can be sent back periodically according to a specified schedule, e.g., every day or every 5 minutes, depending on the requirements. In some other implementations, customers push events periodically or in realtime to the IP-stat process, the generated signals are feed into detection framework to be combined with signals from other detection engines. The detection framework will combine all signals to produce a set of overall signals to be sent back to customers.

IP-Stat Features and Statistics

The IP-stat process computes a set of features and statistics for each IP address or IP address ranges.

Some of the IP features are relatively straightforward to compute, for example, the number of unique users and users with various types of actions. Besides generating simple IP features, new, more sophisticated, IP address properties are also determined.

This specification describes three processes to derive new IP property features, which will each be described in turn:
 Predictable IP address and predictable IP range calculation,
 User co-login analysis, and
 Malicious proxy detection without using labeled data.

Predictable IP Address (and Range) Calculation

A user's predictable IP address (or range) is an IP address (or range) that the user is likely to use in the future with a high probability. For example, a static home IP address is the user's predictable IP address. Sometimes, the predictable IP address can also be a range. For example, if the home IP is on dynamic IP address range, where IP address can change frequently, that range becomes a predictable IP range. A predictable IP address (or range) for a user is not necessarily an IP address (or range) that the user has used in the past. Rather, it captures the notion of whether the user is likely to use it in future. For example, if a user has the habit of accessing the Internet from a retail outlet, of a chain of coffee shops from a certain region, then any IP address (or range) that is associated with the chain of coffee shops in the same region may be a predictable IP address (or range) for this user.

One example statistical method that can be used by the system to calculate predicable IP addresses for a user is provided. The system first checks, over the history, how many days the user uses a particular IP address (or IP range if dynamic). In some implementations, the system uses the number of active days/weeks/months, rather than the number of events because to distinguish the case where the user has conducted many events on one particular day, vs. the case where the user conducted one event every day and does so consistently over days. The former case might be a one-time event that will not frequently happen again. For example, a user may go to a medical specialist's office and, while waiting, the user can send many emails there. However, this may be a rare event that will not happen again. In contrast, the latter pattern (i.e., daily access) qualifies a predictable IP address, as the user is highly likely to use this IP address again in future.

The system uses a mathematical computation to quantify the probability of a user visiting a particular IP address (or range). In particular, in some implementations, the system uses a T-distribution to calculate a 90% confidence interval of future appearance probability. For example: Suppose among n total days (or weeks or months), the user uses an IP address or IP address range form days (or weeks or months). The variance of the user uses this IP address again in the next day/week/month is:

$$L = A \frac{\sqrt{(n-m)*m}}{n*\sqrt{n-1}},$$

where the A value can be retrieved from the a T table, for example, as described at http://en.wikipedia.org/wiki/Student%27s_t-distribution, which is incorporated here by reference.

The probability of the user u to use this IP address again therefore is $$P_u = \left[\max\left(0, \frac{m}{n} - L\right), \min\left(\frac{m}{n} + L, 1\right)\right] \quad (1)$$

Here, the mean appearance probability is $$\frac{m}{n}$$

and the 90% confidence variance is L. So, the 90% confidence has a range of $$\left[\frac{m}{n} - L, \frac{m}{n} + L\right].$$

As the probability can't be larger than 1 or smaller than 0, we take the max of $$\left(0, \frac{m}{n} - L\right)$$

to be the lower bound and min $$\left(\frac{m}{n} + L, 1\right)$$

the upper bound.

A user might have multiple predictable IP addresses/ranges. For example, his home, work, and the coffee shop that he often goes to. For each predictable IP address, the system calculates their respective probabilities independently. Therefore, for each user, for every IP address that the user has used, we generate a set of predictability scores including a daily score, a weekly score, and a monthly score.

Also note that different calculation intervals (day or week or month) can each produce a prediction value. For new users that do not have long history, the monthly prediction value is not relevant and the daily value would be more useful. However, for an old user, monthly prediction value might offer a better signal, because the daily value might be polluted by attackers (e.g., shipping the account to a foreign IP and login every day there). Therefore, the week/month prediction values are more useful for compromised user detection.

User Co-Login Analysis

Besides analyzing users individually, the system can also analyze the users that login together on the same IP. This provides us signals on whether this IP address is potentially a bad one (e.g., botnet hosts or dedicated bad IPs).

Intuitively, when multiple users log in using the same IP address, if this IP address is the predictable IP address for all of these users, likely this is a good IP address/proxy. If this IP address is not the predictable IP address for any of these users, then this IP has a higher chance to be a malicious proxy.

To quantify the likelihood, one approach is to use the average predictability score $P_u$ that a user will use a particular IP address again calculated in Equation 1 as follows:

$$P_{ave} = \frac{\sum_{i=0}^{n} P_u}{n} \quad (2)$$

Here, n is the total number of users that co-login on a particular IP address during a specified time frame.

Alternatively, the system can also look at the distribution of predictability values to determine the confidence of the prediction. For example, if there are only one or two users with low predictable values, the confidence is low. However, if there are many users, all with low predictable values, the confidence is much higher.

Moreover, the history of an IP address can provide signals to enhance analysis confidence. For example, when a group of users attend a conference. They would share the conference location's wifi access, thus they generate co-login events. As these users may not come to this conference location often, this IP address is not the predictable IP address for most of the users. However, as this is a conference place, it will have new users coming to the location all the time, so a low predictability score does not necessarily mean the corresponding IP address will be suspicious.

The predictability metric can be combined with other IP address statistics and user statistics in detection.

Malicious Proxy Detection without Labeled Data

Historically, proxy information has been widely used to help detect attacks. It is commonly believed that there are good proxies that serve many legitimate users, while there are bad proxies that are set up by attackers and serve mostly malicious users. Previous work has developed machine learning-based methods to automatically differentiate good proxies from bad ones. However, learning-based approaches require training data, which is hard to obtain in most scenarios, as attack patterns are often new.

In some implementations, the suspiciousness of an IP address can be quantified without using training data. To do so, the system leverages the fact that bot machines are often rented and they are an expensive resource for attackers. As a result, attackers usually use one bot machines to conduct multiple events. To capture this behavior, the system can look at the timing of events. Here are a few example categories of features the system can analyze:

Diurnal patterns (repeatability) of events over days, weeks, and months.

The variation of events counts over days, weeks, and months.

The uneven distribution of different types of events. For example, if an IP address has many new user signup events, but few login events. That's very suspicious.

In addition, the system can analyze group user behavior on the IP/IP ranges. A group of correlated user's behavior rather than individual user behavior is analyzed because the group behavior is more robust and provides stronger signal: It is normal for individual users to have diverse behavior, so outlier-based abnormally detection methods often yield either high false positive or low recall rates.

The behavior of groups of correlated users, on the contrary, provides more robust signals. For a group of legitimate users, even if they use the same proxy IP, or have similar behavior (e.g., buying a product), most of their other features vary. For example, they would have different registration time, login counts, actions etc. So, the distributions of their other features usually follow the distribution of overall population. However, for attacker-created users, their actions are all controlled by the same attackers remotely, so their actions would be similar and they would amplify each other's signal.

Applications

In addition to be combined with other features and user stats for detection, the IP address features can also be directly used for detection. Following are a list of example usage scenarios:

Compromised or fake account detection. When a user's monthly/weekly predictability score on one of his IP addresses is low, this means the user account has been observed at new IP address location that can't be predicted. This signal can be sent to the service providers to take remedy actions. The service provider can prompt the user to answer security questions, or to use second factor authentication to make sure the account hasn't been compromised.

When a correlated group of users all have low predictability scores on some of their IP addresses, the system will have a higher confidence that this group of users is all suspicious. In addition, it is highly likely that they are controlled by the same attackers. For such groups, one option is to take action immediately. For example, if such a user is an old user, the system can ask the user to recover account. Another more conservative option is to mark them first. Later, if the system observes one or several users in the group perform malicious activities, the system can take action to the entire group.

The IP stats derived from different input sources can provide better signals for detection. For example, if there are 5 input sources, 4 of them see one IP address has a relatively low number of event, but the $5^{th}$ one sees a sudden increase of usage on this IP with low predictable score users, this IP could be a malicious proxy set up by the attacker to target the $5^{th}$ service only. Additionally, the new activities on this IP need to be closely monitored for the first four services, as the attacker has already gained control of this IP, he may choose to attack other services using this IP later.

The IP stats derived from one or more online services can be used by a new service. The knowledge such as regular user population size, malicious proxies, bad IP ranges, and normal user diurnal patterns are informational to a new service (even if the analysis is not performed based on the new service's data). If the IP-stat information is provided through a service query model, the third party's querying action itself can also be leveraged as input to enhance IP-stat computation. This is because a typical query implies a user action on this IP address from the querying party's service.

The IP stats features can also be feed directly to a machine learning system. The suspicious accounts detected through the IP stat system can be used as malicious labeled data. The features derived by IP stat module can be combined with features derived by other systems to train a model for detecting malicious users or events.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining a collection of data associated with a plurality of user events;
processing the collection of data to compute a plurality of IP address properties that comprise particular features associated with one or more individual IP addresses and one or more IP address ranges, wherein the IP address properties include a predictable IP address property for a particular user for each IP address the user has used, wherein each predictable IP address property for the particular user corresponds to a calculated probability that the particular user will use a specific IP address or IP address range again based on prior IP address usage; and
using the plurality of IP address properties to calculate a probability that events associated with particular IP addresses or IP address ranges are malicious, wherein calculating the probability that events associated with a particular IP address or IP address ranges are malicious includes determining that a group of correlated users all have a predictable IP address property indicating a low likelihood that the user will use to use the corresponding IP address or IP address range again.

2. The method of claim 1, wherein calculating the probability that events associated with a particular IP address are malicious includes determining a distribution of event types within the collection of data for the IP address.

3. The method of claim 2, wherein an uneven distribution of occurrences of particular types of events on the particular IP address increases a probability of maliciousness.

4. The method of claim 1, wherein calculating the probability that events associated with a particular IP address are malicious includes analyzing IP properties for a group of correlated users for distributions of features that do not follow a distribution of the features for an overall population of users.

5. The method of claim 1, wherein determining that the predictable IP address property indicates a low likelihood for a particular IP address results in calculating an increased probability that the IP address is malicious.

6. The method of claim 1, further comprising:
comparing IP address properties from different input sources when calculating the probability that events associated with particular IP addresses or IP address ranges are malicious.

7. The method of claim 1, wherein accounts associated with malicious IP addresses are uses as labeled data for a machine learning system configured to detect malicious accounts.

8. A system comprising:
one or more computers configured to perform operations comprising:
obtaining a collection of data associated with a plurality of user events;
processing the collection of data to compute a plurality of IP address properties that comprise particular features associated with one or more individual IP addresses and one or more IP address ranges, wherein the IP address properties include a predictable IP address property for a particular user for each IP address the user has used, wherein each predictable IP address property for the particular user corresponds to a calculated probability that the particular user will use a specific IP address or IP address range again based on prior IP address usage; and
using the plurality of IP address properties to calculate a probability that events associated with particular IP addresses or IP address ranges are malicious, wherein calculating the probability that events associated with a particular IP address or IP address ranges are malicious includes determining that a group of correlated users all have a predictable IP address property indicating a low likelihood that the user will use to use the corresponding IP address or IP address range again.

9. The system of claim 8, wherein calculating the probability that events associated with a particular IP address are malicious includes determining a distribution of event types within the collection of data for the IP address.

10. The system of claim 9, wherein an uneven distribution of occurrences of particular types of events on the particular IP address increases a probability of maliciousness.

11. The system of claim 8, wherein calculating the probability that events associated with a particular IP address are malicious includes analyzing IP properties for a group of correlated users for distributions of features that do not follow a distribution of the features for an overall population of users.

12. The system of claim 8, wherein determining that the predictable IP address property indicates a low likelihood for a particular IP address results in calculating an increased probability that the IP address is malicious.

13. The system of claim 8, wherein the one or more computers are further configured to perform operations comprising:
comparing IP address properties from different input sources when calculating the probability that events associated with particular IP addresses or IP address ranges are malicious.

14. The system of claim 8, wherein accounts associated with malicious IP addresses are uses as labeled data for a machine learning system configured to detect malicious accounts.

* * * * *